United States Patent
Barber et al.

(10) Patent No.: US 7,010,666 B1
(45) Date of Patent: Mar. 7, 2006

(54) METHODS AND APPARATUS FOR MEMORY MAP GENERATION ON A PROGRAMMABLE CHIP

(75) Inventors: Janet Barber, Santa Cruz, CA (US); Michael Fairman, Santa Cruz, CA (US)

(73) Assignee: Altera Corporation, San Jose, CA (US)

(*) Notice: Subject to any disclaimer, the term of this patent is extended or adjusted under 35 U.S.C. 154(b) by 199 days.

(21) Appl. No.: 10/338,784

(22) Filed: Jan. 6, 2003

(51) Int. Cl.
*G06F 12/00* (2006.01)

(52) U.S. Cl. ........................................... 711/220
(58) Field of Classification Search ......... 711/219–220
See application file for complete search history.

(56) References Cited

U.S. PATENT DOCUMENTS 5,218,684 A * 6/1993 Hayes et al. ............... 711/219
6,075,935 A * 6/2000 Ussery et al. ............... 716/17
2002/0059054 A1 * 5/2002 Bade et al. ................. 703/20

FOREIGN PATENT DOCUMENTS

| EP | 0 949 777 A2 | 4/1999 |
| WO | WO 01/05083 A1 | 1/2001 |

OTHER PUBLICATIONS

PCT International Search Report in International Application No. PCT/US2004/007660, dated Oct. 1, 2004, 11 pages.

* cited by examiner

*Primary Examiner*—Matthew D. Anderson
(74) *Attorney, Agent, or Firm*—Beyer Weaver & Thomas, LLP

(57) ABSTRACT

Methods and apparatus are provided for the automatic assignment of addresses for slave components to be implemented on a programmable chip. Slave components including peripheral components and peripheral interfaces are assigned to master components. In some examples, master components and slave components are analyzed using criteria such as address space availability and address span width to more efficiently assign base addresses for the various slave components on a programmable chip.

52 Claims, 8 Drawing Sheets

Figure 3

| | Module Name | Base Address | End Address | Bus Type | IRQ |
|---|---|---|---|---|---|
| 311 | CPU | N/A | N/A | Bus1 | N/A |
| 313 | Boot Monitor | 0x00804400 | 0x008047FF | Bus1 | N/A |
| 315 | UART_1 | 0x00804000 | 0x0080401F | Bus1 | 16 |
| 317 | UART_2 | 0x00804020 | 0x0080403F | Bus1 | 17 |
| 321 | Bridge | N/A | N/A | Bus 1 & Bus 2 | N/A |
| 323 | External Flash Memory | 0x00808000 | 0x0080BFFF | Bus 2 | N/A |
| 325 | External SRAM | 0x00840000 | 0x0087FFFF | Bus 2 | N/A |
| 327 | Timer | 0x00804040 | 0x0080405F | Bus 1 | 18 |
| 329 | Parallel I/O | 0x00804060 | 0x0080406F | Bus 1 | N/A |

351 — Module Name; 353 — Base Address; 355 — End Address; 357 — Bus Type; 359 — IRQ

Figure 4

| Valid Address Range 421 | 0x00804000 423 | 0x00804FFF 425 |
|---|---|---|
| Available Address Ranges 451 | 0x008040FF 453 | 0x00804FFF 455 |

405 →

| Valid Address Range 411 | 0x008040FF 413 | 0x0087FFFFF 415 |
|---|---|---|
| Available Address Ranges 491 | 0x008040FF 457 | 0x008700FF 459 |
| | ... | |

| Master Component 501 | Slave Component 511 | 0x00806000 513 | 0x00806FFF 515 |
| --- | --- | --- | --- |
| | Slave Component 521 | 0x00805200 523 | 0x008052FF 525 |
| | Slave Component 531 | 0x00805000 533 | 0x008051FF 535 |
| | Slave Component 541 | 0x00805300 547 | 0x008055FF 549 |

METHODS AND APPARATUS FOR MEMORY MAP GENERATION ON A PROGRAMMABLE CHIP

BACKGROUND OF THE INVENTION

1. Field of the Invention

The present invention relates to a system on a programmable chip. More specifically, the present invention relates to methods and apparatus for implementing master components and slave components on a programmable chip.

2. Description of Related Art

A number of benefits have spurred efforts towards developing programmable chips that can include a variety of components. In some examples, programmable chips can be implemented with both logic elements, a processor core, as well as peripheral components and interfaces. Integrating master components such as processor cores and slave components such as peripherals along with logic elements on a single programmable chip allows efficient and effective processing.

Some mechanisms for implementing a programmable chip entail using a general purpose programming language or a high level language. In one example, code written in a general purpose programming language such as C or C++ is converted into a hardware descriptor language (HDL) file using a tool such as the DK1 Design Suite available from Celoxica Corporation of Abingdon, United Kingdom. The HDL file can then be synthesized and implemented on a programmable chip such as a programmable logic device (PLD) or a field programmable gate array (FPGA). Some available synthesis tools are Leonardo Spectrum, available from Mentor Graphics Corporation of Wilsonville, Oreg. and Synplify available from Synplicity Corporation of Sunnyvale, Calif.

However, mechanisms for efficiently implementing both master components and slave components on a programmable chip are limited. In particular, mechanisms for generating a memory map on a programmable chip having master components and slave components are inefficient. It is therefore desirable to provide improved methods and apparatus for implementing a programmable chip with master components as well as slave components.

SUMMARY OF THE INVENTION

Methods and apparatus are provided for the automatic assignment of addresses for slave components to be implemented on a programmable chip. Slave components including peripheral components and peripheral interfaces are assigned to master components. In some examples, master components and slave components are analyzed using criteria such as address space availability and address span width to more efficiently assign base addresses for the various slave components on a programmable chip.

In one embodiment, a method for generating a memory map associated with a programmable chip is provided. Information identifying a first master component to be implemented on a programmable chip is received. The first master component is configurable with a first valid address range. Information identifying a first slave component to be implemented on the programmable chip is received. The first slave component is configurable as a component connected to the first master component. Information for implementing the first slave component on the programmable chip is included in a library of components. Information identifying a second slave component for implementation on the programmable chip is received. The second slave component is associated with a second address span. The second slave component is configurable as a component connected to the first master component. A first address span for the first slave component is determined. The first address span corresponds to a first base address and a first end address within the first valid address range. A second address span for the second slave component is determined. The second address span does not overlapping with the first address span. The second address span corresponds to a second base address and a second end address within the first valid address range.

In another embodiment, a computer system for implementing a programmable chip is provided. The computer includes an input interface, a storage mechanism, and a processor. An input interface is configured to receive information identifying a first master component to be implemented on, a programmable chip and information identifying a first slave component to be implemented on the programmable chip. The first slave component is configurable as a component connected to the first master component. A storage mechanism is configured to hold information for implementing a plurality of components including the first slave component. Information for implementing the plurality of components is included in a library of components. A processor is configured to determine a first address span for the first slave component. The first address span corresponds to a first base address and a first end address within a first valid address range associated with the first master component.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 3 is a diagrammatic representation showing components to be implemented on a programmable chip.

FIG. 4 is a diagrammatic representation of a vector of valid address ranges and a vector of available ranges.

FIG. 5 is a diagrammatic representation of a vector of valid address ranges and a vector of available ranges.

DETAILED DESCRIPTION OF SPECIFIC EMBODIMENTS

Figure 1:
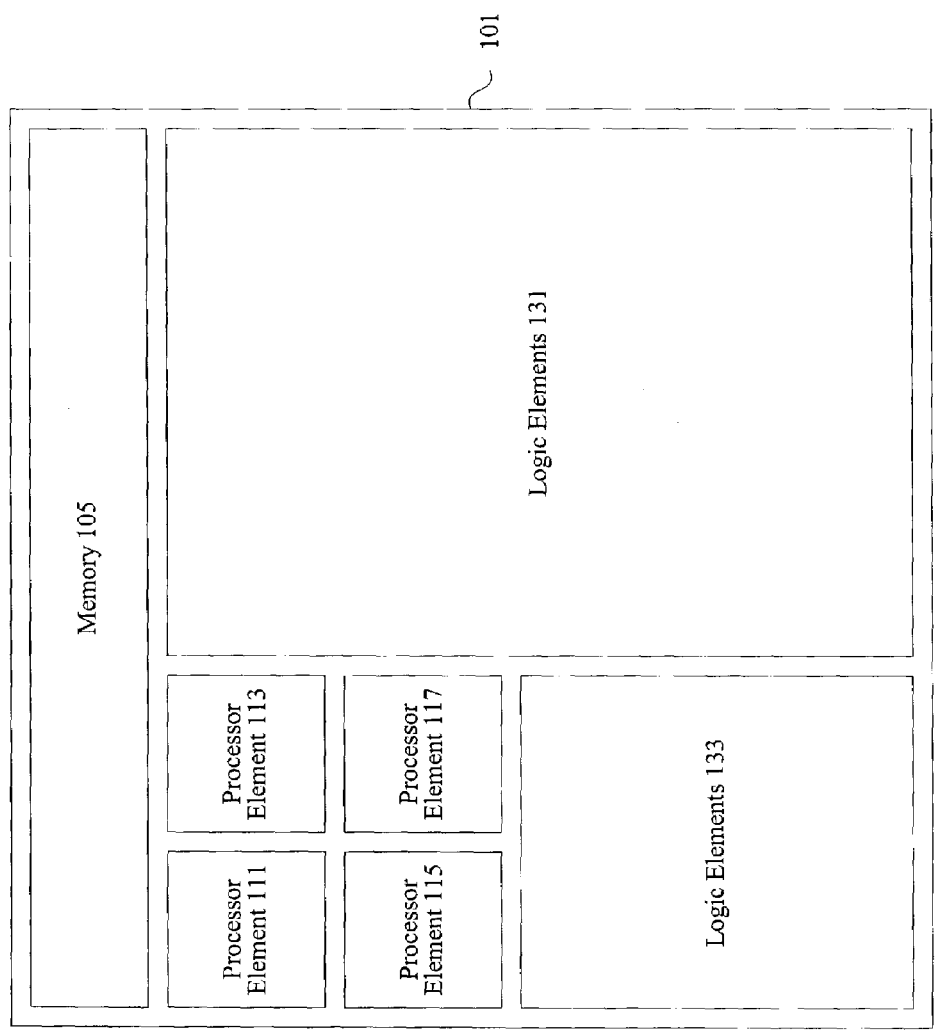
FIG. 1 is a diagrammatic representation showing a device that can be the target of the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of master and slave components on a programmable chip. However, it should be noted that the techniques of the present invention can be applied to a variety of chips, including system on a chip configurations. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A variety of master components and slave components can be implemented on many programmable chips. Master components are coupled to a variety of slave components using mechanisms such as a shared bus. Any component that provides other components with commands as well as data is referred to herein as a master component. One example of master component is a processing core. Another example of a master component is a direct memory access (DMA) component. Any component that receives commands as well as data is referred to herein as a slave component. Examples of slave components include universal asynchronous receiver transmitters (UARTs), timers, parallel input output components, memory, as well as other memory and I/O devices. In some examples, a component such as a DMA component can be both a master component and a slave component. It should be noted that slave components may include both peripherals components and peripherals interfaces.

One mechanism allowing the master components to provide commands to slave components is a memory map. After a system designer selects master components as well as slave components to be implemented on a programmable chip, a system designer can allow transmission of commands to slave components from particular master components by using a memory map. In typical systems, a master component gives a command to a slave component by addressing the slave component and supplying the slave component with one or more instructions. In a memory mapped system, portions of an address space are assigned to slave components. Reads and writes to the assigned portions are interpreted as commands to the slave components.

In one example, a slave component includes a controller that sees data being written to an assigned portion of the address space. The slave component uses the data written to determine the type of command as well as any data that may have been provided by a write or obtained by a read. In many systems with a large number slave components as well as master components, slave components for any given master are assigned unique address spaces. In many programmable chip systems, the size of the address space itself may not be known until the memory mapping process is complete.

According to various embodiments the techniques of the present invention provide the capability of automatically assigning address spans for the slave components selected in a system. Any range of addresses corresponding to a base address and an end address associated with a particular slave component is referred to herein as an address span. The techniques of the present invention reduce the need for time-consuming and error prone manual methods for assigning addresses. Mechanisms are provided for optimizing the location of components in a memory space while providing for the case for multiple master components are connected to the same set of slave components. Parameterizable components, that may have different address spans based on parameters entered, are handled efficiently and effectively. Overrides are also provided in the cases where slave components are to be located at specific addresses or overlapping address spans are needed because of a limited address space.

FIG. 1 is a diagrammatic representation of a programmable chip that can be used with the techniques of the present invention. Any programmable chips configurable with master components and slave components can be the targets of the methods and apparatus of the present invention. In one example, a heterogeneous programmable chip includes memory 105, logic elements 131 and 133, and processor elements 111, 113, 115, and 117. It should be noted that various components such as processor elements 111, 113, 115, and 117 are optional. The programmable chip does not need these elements incorporated and may instead have one or more processor cores. In the example where processor elements are provided, a variety of different components can be assembled to form a processor core. Instead of providing a generic processor core on a programmable chip, different components are provided to allow customization of the processor core.

In some examples, shifters and arithmetic logic units (ALUs) are provided as components that can be assembled. The shifters and ALUs can be parameterized to allow further customization of the processor core. In many implementations, parameterizing a soft core entails building only the portion that will be used. A variety of other components can also be implemented using logic elements. In some examples, preconfigured intellectual property (IP) blocks allow a system designer to integrate other components such as parallel input/output (PIO), universal asynchronous receiver transmitters (UARTs), and timers with a processor core.

It should be noted that although the techniques of the present invention will be described in the context of processor elements and logic elements, a variety of resources may be available on a programmable chip. For example, some other resources include phase locked loops (PLLs) and multiplexers (MUXes). Logic elements 131 typically can be implemented using components such as antifuses, static RAM, and EPROMS. Any mechanism in a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

Figure 2:
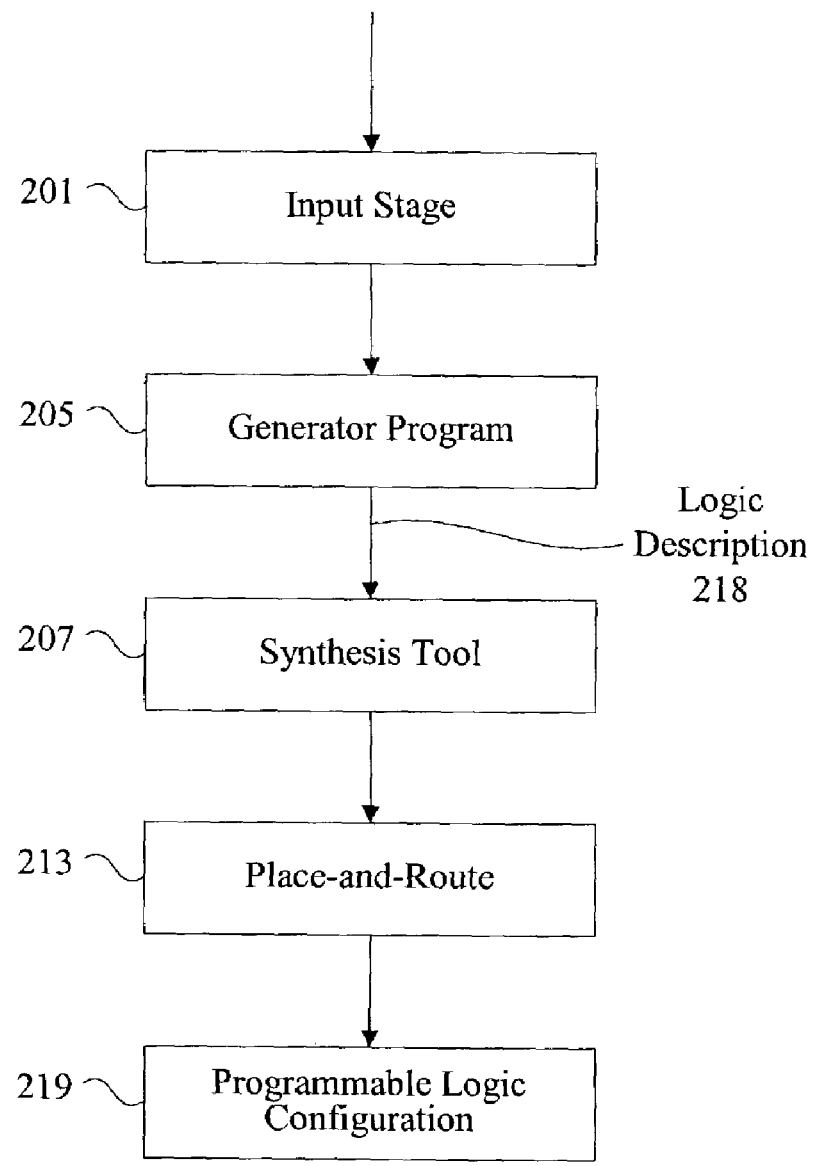
FIG. 2 is a diagrammatic representation showing the programming of the target device.

FIG. 2 is a diagrammatic representation of one example of the various programs, tools, and stages that are commonly used to implement a programmable chip. An input stage 201 receives selection information typically from a user for logic such as a processor as well as other components to be implemented on a programmable chip. Selection information may include information identifying master components and slave components for implementation on a programmable chip. Master components may include devices such as processor cores and direct memory access (DMA) components. Slave components typically include peripherals interfaces and peripheral components such as PIO, UARTs, timers, external flash memory, etc. A system designer typically provides the master components and the slave components along with a memory map noting where slave components reside in an address space. Typical manual techniques for assigning addresses to slave components did not consider many characteristics of programmable chips. In one example, many techniques do not optimize address assignment based upon the multiple master nature of programmable chip systems.

Similarly, many techniques do not consider parameterizable components or a dynamic address space, where an address space can in fact be reduced based upon efficient assignment of addresses. An input stage 201 allows selection and parameterization of components to be used with customized logic. In some examples, components provided to an input stage include intellectual property functions, megafunctions, and intellectual property cores. The input stage 201 may be a graphical user interface using wizards for allowing efficient or convenient entry of information. The input stage may also be a text interface or a program reading a data file such as a spreadsheet, database table, or schematic to acquire selection information. The input stage 201 produces an output containing information about the various modules selected.

After selection information is received identifying the components to be implemented on a programmable chip, a generator program 205 creates a logic description of the device based on user specifications and provides the logic description to any of a variety of synthesis tools, place and route programs, and programmable logic configuration tools to allow a logic description to be downloaded onto the programmable chip.

In typical implementations, the generator program 205 can identify the selections and generate a logic description with information for implementing the various modules. The generator program 205 can be a Perl script creating HDL files such as Verilog, Abel, VHDL, and AHDL files from the module information entered by a user. According to various embodiments, the generator program 205 also provides information to a synthesis tool 207 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif.

As will be appreciated by one of skill in the art, the input stage 201, generator program 205, and synthesis tool 207 can be separate programs. The interface between the separate programs can be a database file, a log, or simply messages transmitted between the programs. For example, instead of writing a file to storage, the input stage 201 can send messages directly to the generator program 205 to allow the generator program to create a logic description. Similarly, the generator program can provide information directly to the synthesis tool instead of writing HDL files. Similarly, input stage 201, generator program 205, and synthesis tool 207 can be integrated into a single program.

A user may select various modules and an integrated program can then take the user selections and output a logic description in the form of a synthesized netlist without intermediate files. Any mechanism for depicting the logic to be programmed onto a programmable chip is referred to herein as a logic description. According to various embodiments, a logic description is an HDL file such as a VHDL, Abel, AHDL, or Verilog file. A logic description may be in various stages of processing between the user selection of components and parameters to the final configuration of the programmable chip. According to other embodiments, a logic description is a synthesized netlist such as an Electronic Design Interchange Format Input File (EDF file). An EDF file is one example of a synthesized netlist file that can be output by the synthesis tool 207.

A synthesis tool 207 can take HDL files and output EDF files. Various synthesized netlist formats will be appreciated by one of skill in the art. The synthesized netlist file can be read by a place and route tool 213. A place and route tool typically locates logic cells onto specific logic elements of a target hardware device and connects wires between the inputs and outputs of the various logic elements in accordance with logic required to implement an electronic design. A programmable logic configuration stage 219 can take the output of the place and route tool to program the logic device with the user selected and parameterized modules. According to various embodiments, the place and route tool 213 and the programmable logic configuration stage 219 are provided in the Quartus Development Tool, available from Altera Corporation of San Jose, Calif. As will be appreciated by one of skill in the art, a variety of synthesis, place and route, and programmable logic configuration tools can be used to implement various techniques of the present invention.

As noted above, different stages and programs can be integrated in a variety of manners. According to one embodiment, the input stage 201, the generator program 205, the synthesis tool 207, the place and route tool 213, and the programmable logic configuration stage 219 are integrated into a single program. The various stages are automatically run and transparent to a user. The program can receive the user selected modules, generate an logic description depicting logic for implementing the various selected modules, and implement the programmable chip. As will be appreciated by one of skill in the art, HDL files and EDF files are mere examples of a logic description. Other file formats as well as internal program representations are other examples of a logic description. Internal program representations can be transitory data used by a program to provide information for implementing various components on programmable chips.

The techniques shown in FIG. 2 can be used to implement a programmable chip with components having automatically assigned address spans. FIG. 3 is a diagrammatic representation of a component table showing master components and associated slave components having automatically assigned address spans. According to various embodiments, various master components are assigned valid address ranges. Multiple master components can have valid address ranges that overlap. In typical implementations, a variety of slave components to be implemented on a system with multiple master components are first associated with particular master components. Slave components associated with the same master typically can not have overlapping address spans, although the techniques of the present invention allow slave components to have address spans that overlap in certain instances.

Various considerations may be taken before associating the various slave components to master components. In some examples, slaves are first sign assigned to a central processing unit (CPU) as long as the CPU has additional space in its valid address range. Another consideration is whether the available space in the valid address range for that master can accommodate the address span of the slave component being connected. In other examples, 16-bit slave components are assigned to 16-bit master components and 32-bit slave components are assigned to 32-bit master components. According to various embodiments, if a master component such as a CPU does not have sufficient address space in its valid address range, components are assigned to other master components.

The component table shown in FIG. 3 shows a variety of components and their associated addresses. According to various embodiments, the table shown in FIG. 3 can be used to allow a system designer to enter the different components to be implemented on a programmable chip. A system designer can then execute a function associated with the component table 301 in order to calculate the address as shown in columns 353 and 355 corresponding to the base and end addresses. The component table can also include other information associated with the various components such as the bus associated with the component as well as any associated interrupt request numbers (i.e. IRQs). In one example, a boot monitor entry 313, UART entries 315 and 317, timer entry 327, and parallel I/O 329 are all coupled to the same bus as the CPU in entry 311. The bridge in entry 321 is also coupled to the same bus as a CPU in entry 311.

However the bridge is also coupled to a second bus that allows communication with an external flash memory in entry 323 and an external SRAM in entry 325. According to various embodiments, the base and end addresses are initially unassigned. In some implementations, a system designer can manually assign base and end addresses to the various components. However, manually assigning base addresses is not only inefficient and error prone, but also may not consider various optimizing techniques provided in accordance with the present invention. In some examples, a system designer executes a function in a menu associated with an input stage program and addresses associated with the various components are automatically assigned to lowest available addresses that will fit the address span of the slave components as well as align with the address span of the slave components.

According to various embodiments, the techniques of the present invention allow the maintenance of an address map for each master component defined in the system. Each master has a valid address range defined, and any slave component such as peripheral component or a peripheral interface that connects to that master is configured to reside in that range. In some examples, the slave component has an address span that partially resides within the valid address range of the associated master component. In many examples, a slave component is located at an address that is aligned with its span, as calculated from its address width.

In typical implementations, slave components are not allowed to have address ranges that overlap with another slave component that is connected to the same master. However, in some instances, some slave components do not use an entire allocated address range. Consequently, the techniques of the present invention allow slave components to use a reduced address span, making the unused addresses available for other slave components to use. The techniques of the present invention attempt to place slave component in non-overlapping regions, but will assign components to these unused regions when non-overlapping regions are not available.

The address assignment mechanisms can be used to initialize a system or to add or remove components. When a system is being initialized, each address map associated with the various master components is initialized to empty and all slave components that are not locked to specific address spans have their address spans reset. In one implementation, the slave components are sorted so that slave components associated with largest address spans are assigned addresses first, according to what master components the slave components are connected to. Since smaller address spans will likely be left after the assignment of larger address spans, components with smaller address spans can still be accommodated.

The techniques of the present invention also allow multiple master components to communicate with the same set of slave components. In many typical implementations, only a single master component is operable to communicate with particular slave components. However, the automatic address assignment mechanisms of the present invention allow for the efficient assignment of addresses even when components have multiple masters. For any given master, no two slaves can have address ranges that overlap. In the multiple master situation, an address span assigned to a first slave component by a first master should not conflict with an address span assigned to a second slave component by a second master but shared by a first and second master. By starting with the most restricted master, the likelihood that each map can accommodate all the slaves that are attached to it is maximized.

FIG. 4 is a diagrammatic representation of maps associated with master components that can be used to determine the amount of restricted space. Any data structure for maintaining information about valid address ranges, available space, and/or connected slave address spans is referred to herein as a map. A variety of data structures including tables, vectors, lists, etc. can be used to maintain address range information. In one example, a Java class vector is used to implement a map. A memory map for master component 405 indicates that a valid address range 421 for the master component 405 lies between base address 0x00804000 at 423 and end address 0x00804FFF at 425. Some of the addresses associated with master 405 are already restricted, leaving available address range 451. The available address range is relatively restricted, bounded by base address 0x008040FF at 453 and end address 0x00804FFF at 455.

Master component 445, on the other hand, has a relatively large amount of available space. Master component 445 has a valid address range 411 bounded by base address 0x008040FF at 413 and end address 0x0087FFFF at 415. The available address range 491 includes range 0x008040FF at 457 to 0x008700FF at 459. Other address ranges may also be available. When slave components are added or removed from the system, the available address ranges 451 and 491 can be updated. It should be noted that although the valid address ranges shown in FIG. 4 are contiguous for each master component, addresses ranges need not necessarily be contiguous.

According to various embodiments, information is also maintained for all the slave components connected to a particular master. FIG. 5 is a diagrammatic representation showing slave component address spans that may be maintained in a particular master component map. Master component 501 includes slave components 511, 521, 531, and 541. Slave component 511 has base address 0x00806000 at 513 and end address 0x00806FFF at 515. Slave component 521 has base address 0x00805200 at 523 and end address 0x008052FF at 525. Slave component has base address at 0x00805000 at 533 and end address 0x008051FF at 535. Slave component 541 has base address 0x00805300 at 547 and end address 0x008055FF at 549. The vector of slave components is used for both performing validation and assigning addresses. According to various embodiments, the vector of slave components is sorted first by address from lowest to highest. All unaddressed slaves appear at the end, sorted by span. As part of validation, the map will attempt to assign addresses to any unaddressed slaves first. This involves traversing the vector of available addresses searching for a range that is large enough to accommodate the slave. The base address selected must also align with the span of the slave. If no suitable address is found, it is left unassigned.

After assigning all unaddressed slaves, it will traverse the vector of slaves and validate that each slave is contained in the set of ranges defined for the master. It also checks that there are no conflicts with other slaves on the same master and that each slave is aligned at a base address that is a multiple of its span. Errors are generated for each of these conditions. Additionally, slaves that were left unassigned generate an error to indicate that they cannot be accommodated in this address map. Warnings may also be generated if a slave is only partially accessible by the master, or if it is located in the unused region of another slave.

Figure 6:
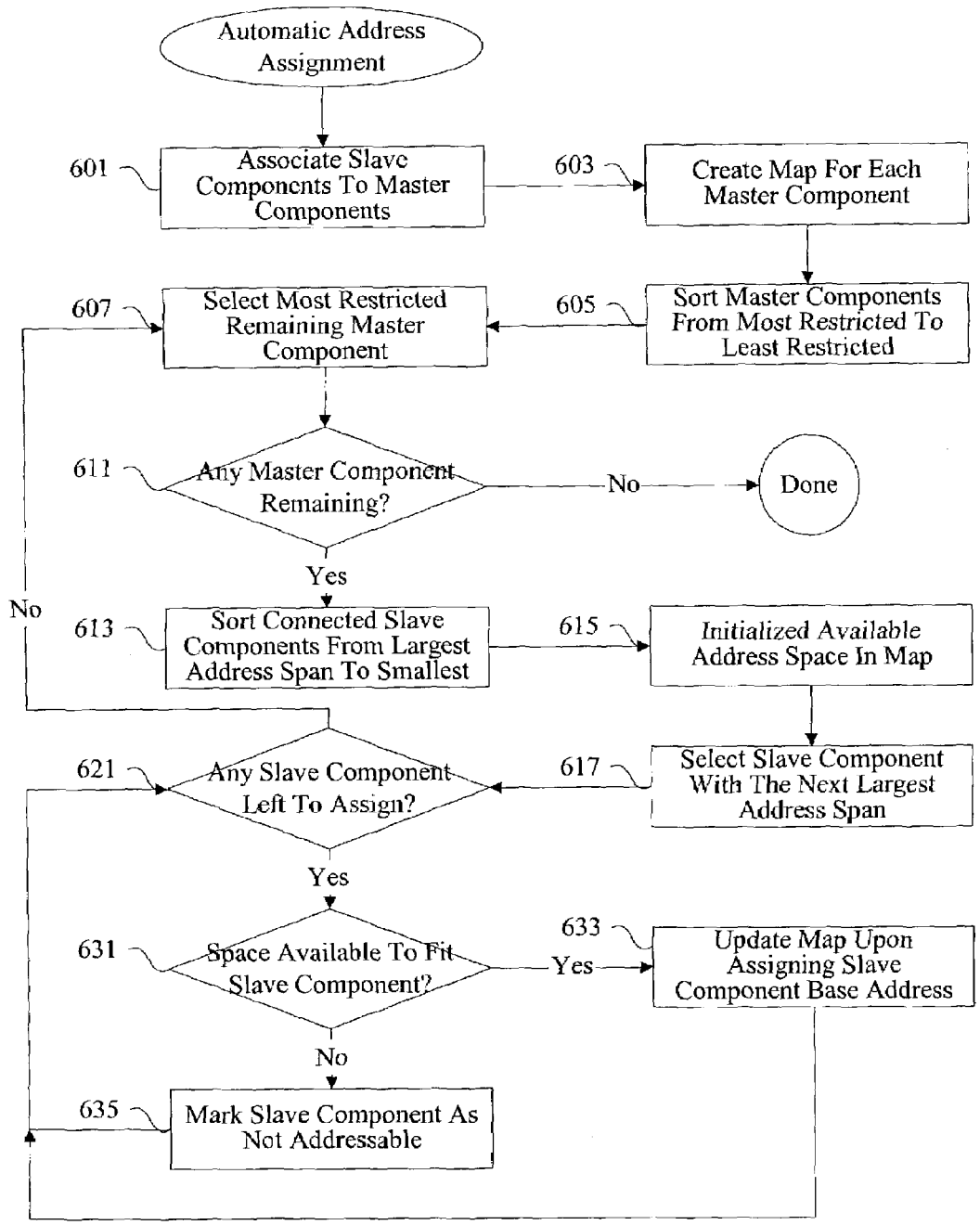
FIG. 6 is a flow process diagram showing a technique for automatic address assignment.

FIG. 6 is a flow process diagram showing one example of a technique for automatic address assignment. At 601, various slave components are associated with various master components. In some examples, slave components are connected to master components through a shared bus. In other examples, slave components are connected to master components through direct links. At 603, a map is created for each master component. In some examples, each map is a table including information on valid address ranges. At 605, the master components are sorted by available unrestricted address space. At 607, the most restricted remaining master component is selected for automatic address assignment of associated slave components. While master components remain at 611, slave components associated with the selected master component are sorted based on address width at 613. In one example, slave component using the most address space are assigned first. At 615, available address space in the master component map is initialized.

At 617, the slave component with the largest address width is selected. While slave components remain at 621, it is determined at 631 if address space is available to fit the slave component. If no space is available, the slave component is marked as not addressable. In some example, attempts can be made to assign the slave component to a different master component. If space is available, the master component map is updated to reflect the assignment of the address span. In some examples, the available addresses associated with the master component as well as the slave component vector are updated in the map.

Figure 7:
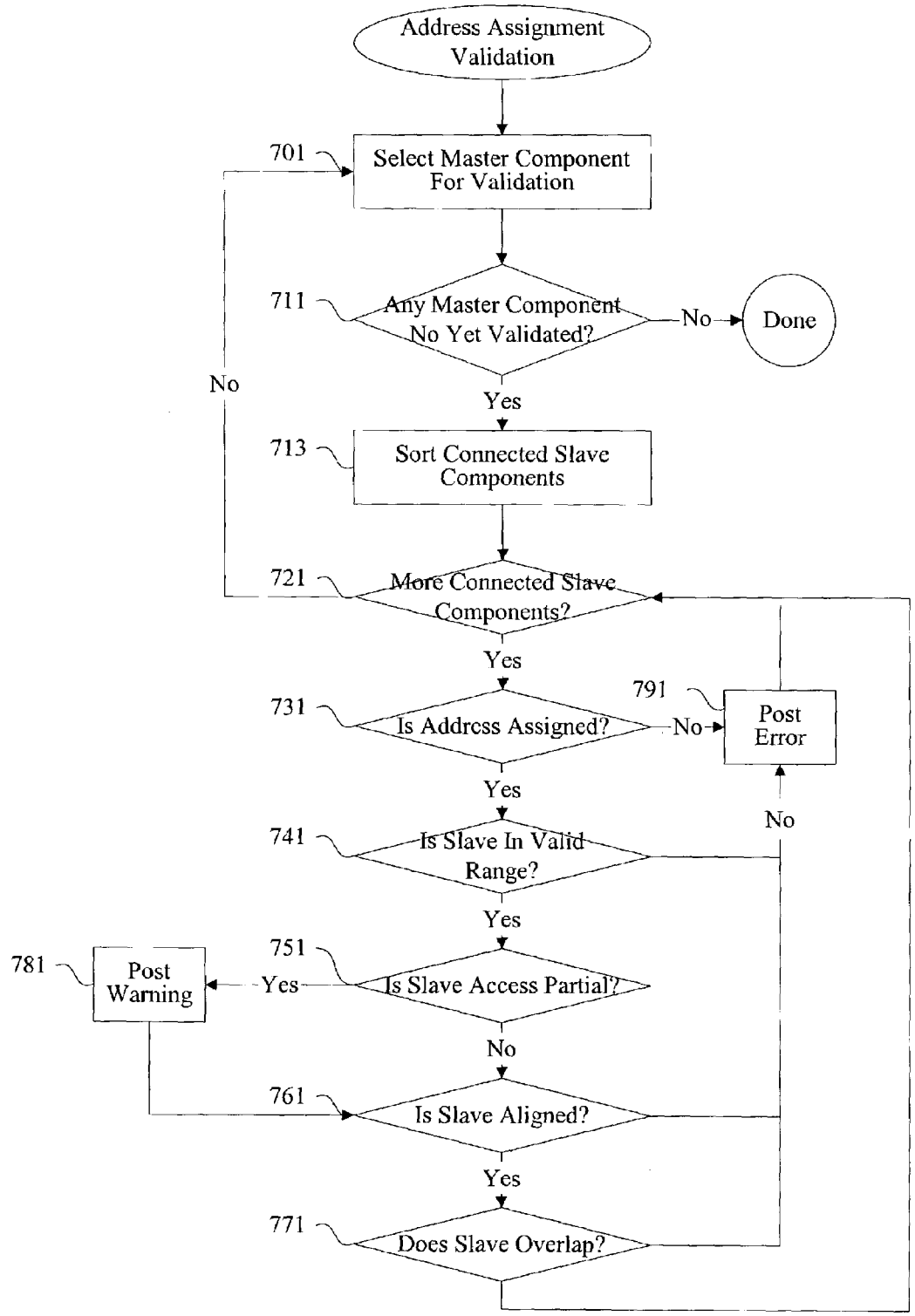
FIG. 7 is a flow process diagram showing a technique for validating assigned addresses.

FIG. 7 is a flow process diagram showing one example of a technique that can be use to validate the assigned address of the various slave components. Validation can be performed anytime after any slave component addresses are assigned. At 701, a master component and an associated map is selected for validation. While master components remain at 711, slave components are sorted at 713 for the master component being validated. In one example, slave components are sorted using base addresses in ascending order. Each slave component is then checked beginning at 721. In one example, slave components are checked to determine if an address is assigned. If no address is assigned at 731, an error is posted at 791. In one example, if an error is posted, a system designer can manually configure addresses or an address assignment mechanism can be reinitialized.

At 741, it is determined if the address span of the slave component lies within the valid range of addresses of the associated master component. If the slave component is not within the valid range of addresses, an error is posted. Otherwise, it is determined if access to the slave component is partial at 751. If access is partial, a warning instead of an error is posted, as various slave component may be intended as partial access components. At 761, it is determined if the slave component address span is aligned, as calculated from the slave component address width. If the slave address span does not align, an error is posted at 791. It can then be determined if the slave component address span overlaps with the address span of another slave component. If the address span overlaps, an error is posted. In some instances, however, it may only be necessary to post a warning, as some addresses in a slave component address span may not be used and instead may be allocated for use by other slave components.

It should be noted that a variety of validation techniques can be used. In some examples, only alignment and overlap may be checked. In other examples, validation may include optimization to reduce fragmentation in the address space. Reducing fragmentation may entail reassigning slave components to address segments that better fit slave component address spans to increase the amount of available contiguous address space for each master component.

Figure 8:
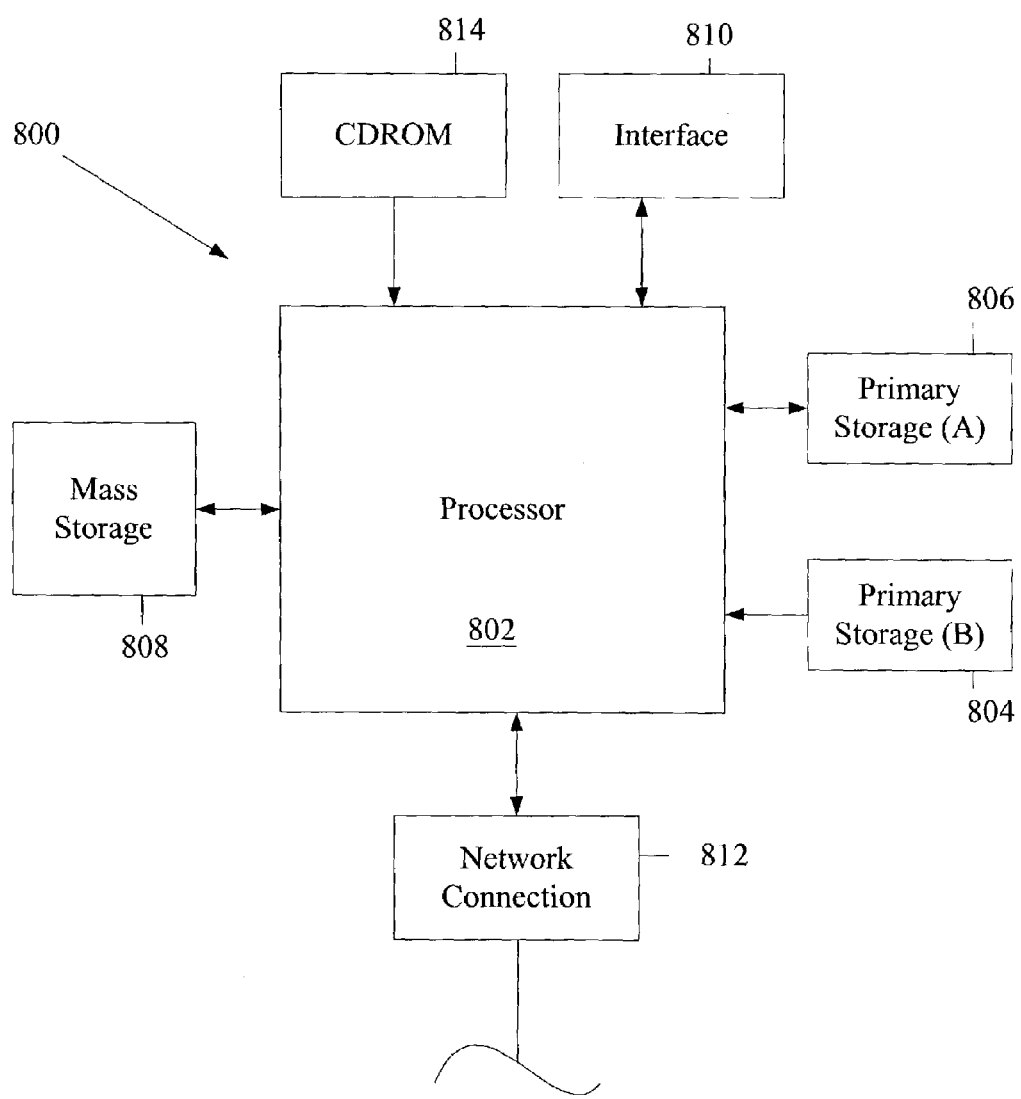
FIG. 8 is a diagrammatic representation of a system for configuring the target device.

FIG. 8 illustrates a typical computer system that can be used to implement a programmable chip in accordance with an embodiment of the present invention. The computer system 800 includes any number of processors 802 (also referred to as central processing units, or CPUs) that are coupled to storage devices including primary storage 806 (typically a random access memory, or "RAM"), primary storage 804 (typically a read only memory, or "ROM"). The processors 802 can be configured to receive selection information from a user to dynamically generate a logic description. As is well known in the art, primary storage 804 acts to transfer data and instructions uni-directionally to the CPU and primary storage 806 is used typically to transfer data and instructions in a bi-directional manner.

Both of these primary storage devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 is also coupled to an interface 810 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 808 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, various aspects described above may be implemented using firmware, software, or hardware. Moreover, aspects of the present invention may be employed with a variety of different file formats, languages, and communication protocols and should not be restricted to the ones mentioned above. Therefore, the scope of the invention should be determined with reference to the appended claims.

What is claimed is:

1. A method for generating a memory map associated with a programmable chip, the method comprising:
   receiving information in a computer system identifying a first master component to be implemented on a programmable chip, wherein the first master component is associated with a map having information identifying a valid address range and available addresses;
   receiving information identifying a first slave component to be implemented on the programmable chip, the first slave component configurable as a component connected to the first master component, wherein information for implementing the first slave component on the programmable chip is included in a library of components, wherein the library of components is provided as a database of preconfigured intellectual property blocks; and
   determining a first address span for the first slave component, the first address span corresponding to a first base address and a first end address within the first valid address range.

2. The method of claim 1, wherein determining the first address span comprises locating the best fit for the first slave component in the first valid address range.

3. The method of claim 1, wherein the first valid address range is contiguous.

4. The method of claim 1, wherein the first master component is a first processor core.

5. The method of claim 1, wherein the first slave component is parameterizable.

6. The method of claim 1, further comprising:
   receiving information identifying a second slave component for implementation on the programmable chip, the second slave component associated with a second address span, the second slave component configurable as a component connected to the first master component; and
   determining a second address span for the second slave component, the second address span not overlapping with the first address span, wherein the second address span corresponds to a second base address and a second end address, wherein the second address span resides at least partially within the first valid address range.

7. The method of claim 6, further comprising assigning the first and second slave components to the first master component.

8. The method of claim 6, wherein the first slave component is parameterizable.

9. The method of claim 8, wherein parameter information associated with the first slave component affects the size of the first address span.

10. The method of claim 6, wherein the first master component is selected from the library of components.

11. The method of claim 6, wherein the second slave component is selected from the library of components.

12. The method of claim 6, wherein determining the second address span comprises receiving a locked address from a system designer.

13. The method of claim 6, further comprising a second master component associated with a second valid address range.

14. The method of claim 13, wherein the first and second valid address ranges overlap.

15. The method of claim 13, wherein the first slave component is accessible by both the first and second master components.

16. The method of claim 15, wherein the first address span resides in a portion where the first and second valid address ranges overlap.

17. The method of claim 13, further comprising selecting a third slave component, wherein the third slave component is configured as a component connected to the second master component.

18. The method of claim 17, wherein the first master component and the second master component are masters of the third slave component.

19. The method of claim 18, wherein the first master component is directly coupled to the first slave component without the use of a shared bus.

20. The method of claim 6, further comprising validating the first and second address spans.

21. The method of claim 20, wherein validating the first and second address spans comprises determining if the first and second slave components are assigned addresses in the valid range of addresses associated with the first master component.

22. The method of claim 20, wherein validating the first and second address spans comprises determining if the first and second address spans are aligned.

23. The method of claim 20, wherein validating the first and second address spans comprises determining if the first and second address spans overlap with address spans of any slave components.

24. The method of claim 20, wherein validating the first and second address spans comprises determining if first and second slave component access is partial.

25. A computer system for implementing a programmable chip, the computer system comprising:
   an input interface configured to receive information identifying a first master component to be implemented on a programmable chip and information identifying a first slave component to be implemented on the programmable chip, the first slave component configurable as a component connected to the first master component;
   a storage mechanism configured to hold information for implementing a plurality of components including the first slave component, wherein information for implementing the plurality of components is included in a library of components; and a processor configured to determine a first address span for the first slave component, the first address span corresponding to a first base address and a first end address within a first valid address range associated with the first master component, wherein the first mast component is associated with a map having information identifying a valid address range and available addresses.

26. The computer system of claim 25, wherein the processor is further configured to receive information identifying a second slave component, wherein information for implementing the second slave component on the programmable chip is included in the library of components.

27. The computer system of claim 26, wherein the processor is further configured to determine a second address span for the second slave component, the second address span not overlapping with the first address span, wherein the second address span corresponds to a second base address and a second end address, wherein the second address span resides at least partially within the first valid address range.

28. The computer system of claim 26, wherein the map further comprises information identifying the slave components coupled to the first master component.

29. The computer system of claim 28, wherein the processor is further configured to validate the address span assigned to the first slave component.

30. The computer system of claim 29, wherein validating the first address span comprises determining if the fit and second slave components are assigned addresses in the valid range of addresses associated with the first master component.

31. The computer system of claim 29, wherein validating the first address span comprises determining if the first address span is aligned.

32. The computer system of claim 29, wherein validating the first address span comprises determining if the first address span overlap with the address spans of any slave components coupled to the first master component.

33. The computer system of claim 29, wherein validating the first address span comprises determining if first and second slave component access is partial.

34. The computer system of claim 25, wherein the processor is further configured to assign the first and second slave components to the first master component.

35. The computer system of claim 25, wherein the first slave component is parameterizable.

36. The computer system of claim 35, wherein parameter information associated with the first slave component affects the size of the first address span.

37. The computer system of claim 25, wherein the first master component is selected from the library of components.

38. The computer system of claim 25, wherein the second slave component is selected from the library of components.

39. The computer system of claim 25, wherein determining the first address span comprises locating the best fit for the first slave component in the first valid address range.

40. The computer system of claim 25, wherein determining the second address span comprises receiving a locked address from a system designer.

41. The computer system of claim 25, wherein the first valid address range is contiguous.

42. The computer system of claim 25, wherein the first master component is a first processor core.

43. The computer system of claim 25, wherein the first slave component is parameterizable.

44. The computer system of claim 25, further comprising a second master component associated with a second valid address range.

45. The computer system of claim 44, wherein the first and second valid address ranges overlap.

46. The computer system of claim 44, wherein the first slave component is accessible by both the first and second master components.

47. An apparatus for generating a memory map associated with a programmable chip, the apparatus comprising:

means for receiving information identifying a first master component to be implemented on a programmable chip, wherein the first master component is associated with a map having information identifying a valid address range and available addresses;

means for receiving information identifying a first slave component to be implemented on the pro ble chip, the first slave component configurable as a component connected to the first master component, wherein information for implementing the first slave component on the programmable chip is included in a library of components, wherein the library of components is provided as a database of preconfigured intellectual property components;

means for receiving information identifying a second slave component for implementation on the programmable chip, the second slave component associated with a second address span, the second slave component configurable as a component connected to the first master component;

means for determining a first address span for the first slave component, the first address span corresponding to a first base address and a first end address within the first valid address range; and means for determining a second address span for the second slave component, the second address span not overlapping with the first address span, wherein the second address span corresponds to a second base address and a second end address within the first valid address range.

48. The apparatus of claim 47, further comprising means for assigning the first and second slave components to the first master component.

49. The apparatus of claim 47, wherein the first slave component is parameterizable.

50. The apparatus of claim 49, wherein parameter information associated with the first slave component affects the size of the first address span.

51. The apparatus of claim 47, wherein the first master component is selected from the library of components.

52. A computer readable medium comprising computer code for implementing a programmable chip, the computer readable medium comprising:

computer code for receiving information identifying a first master component to be implemented on a programmable chip wherein the first master component is associated with a map having information identifying a valid address range and available addresses;

computer code for receiving information identifying a first slave component to be implemented on the programmable chip, the first slave component configurable as a component connected to the first master component, wherein information for implementing the first slave component on the programmable chip is included in a library of components, wherein the library of components is provided as a database of preconfigured intellectual property functions;

computer code for receiving information identifying a second slave component for implementation on the programmable chip, the second slave component associated with a second address span, the second slave component configurable as a component connected to the first master component;

computer code for determining a first address span for the first slave component, the first address span corresponding to a first base address and a first end address within the first valid address range; and computer code for determining a second address span for the second slave component, the second address span not overlapping with the first address span, wherein the second address span corresponds to a second base address and a second end address within the first valid address range.

* * * * *